Jan. 30, 1951 H. C. BOARDMAN Re. 23,335

SUPPORT FOR CONTAINERS

Original Filed June 30, 1944

Inventor:
Harry C. Boardman,
By Christor, Schroeder,
Merriam & Hopper, Attys.

Reissued Jan. 30, 1951 Re. 23,335

UNITED STATES PATENT OFFICE 23,335

SUPPORT FOR CONTAINERS

Harry C. Boardman, Chicago, Ill., assignor to Chicago Bridge & Iron Company, a corporation of Illinois Original No. 2,523,274, dated September 26, 1950, Serial No. 667,052, May 3, 1946, which is a division of Serial No. 542,993, June 30, 1944. Application for reissue November 24, 1950, Serial No. 197,439

7 Claims. (Cl. 248—146)

Matter enclosed in heavy brackets [ ] appears in the original patent but forms no part of this reissue specification; matter printed in italics indicates the additions made by reissue

This invention relates to a support for a container, and relates particularly to a support for a container having a substantially circular horizontal cross-section.

The invention is especially applicable in connection with spherical containers or the like adapted to contain fluids under pressure; for example, spheres holding compressed gas. Sheet metal gas containers are subject to considerable expansion and contraction due to thermal and pressure variations. Owing to this expansion and contraction, difficulty has been encountered in supporting the same.

The present improvement is designed to permit gas holding containers to be tested under hydrostatic pressure while full of water. The present invention also permits the gas holders to be used as water containers if desired. It is primarily intended for strengthening the container to permit hydrostatic testing.

The present invention provides an improved support for containers having a substantially circular horizontal cross-section with the support comprising a skirt having substantially the shape of a frustum of a cone with the upper and larger end of the skirt being attached to the container on a substantially horizontal circle below the equator and the lower and smaller end of the skirt being attached to a substantially horizontal annular compression plate that is located below the point of attachment of the skirt to the container. The upper edge of the skirt is substantially tangent to the sphere.

Figure 1:
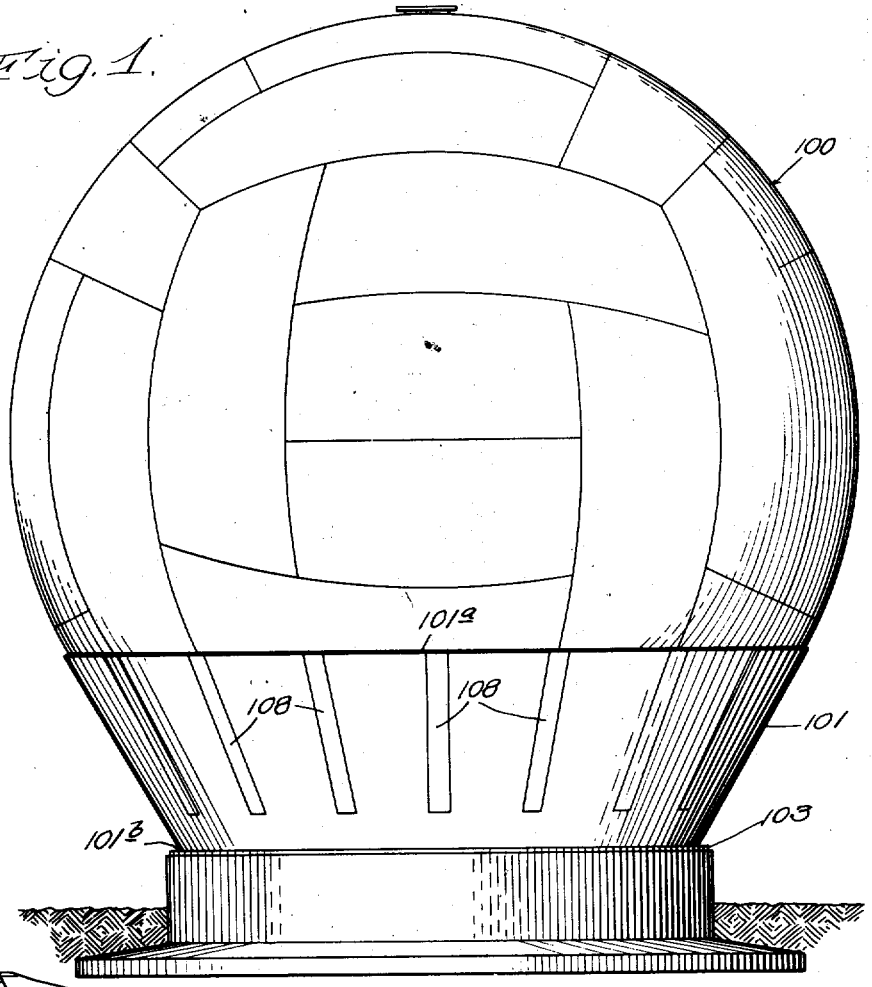
Figure 2:
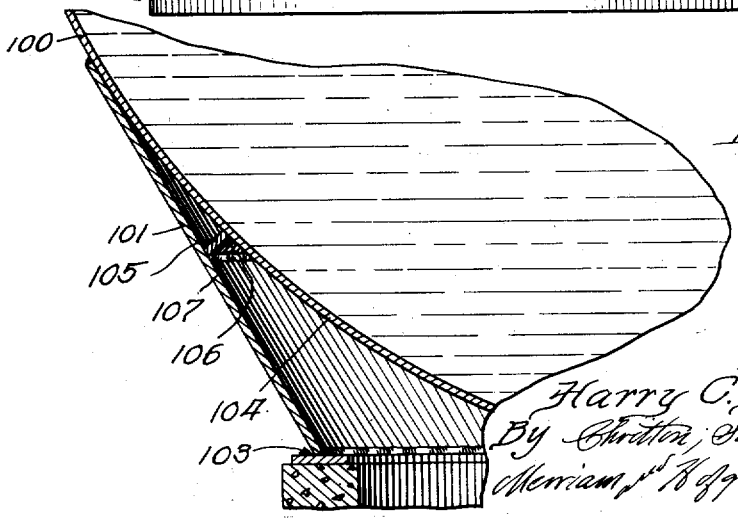

The invention is illustrated in the drawings, in which Fig. 1 is a side elevation of a spherical container supported in accordance with the invention; and Fig. 2 is a fragmentary detailed sectional elevation of a portion of the structure.

As shown in the drawings, the container comprises a sphere 100 supported by a skirt 101 having the shape of a frustum of a cone. The upper and larger end 101*a* of the skirt 101 is attached as by welding to the container on a horizontal circle below the equator of the container. At the point of attachment the skirt is substantially tangent to the container 100. The lower and smaller end 101*b* of the skirt 101 rests upon and is attached to an annular plate 103. This plate, which is under compression, is supported by a suitable foundation. As shown in Fig. 2, the triangular space between the frusto-conical skirt 101 and the bottom 104 of the sphere 100 is hermetically sealed by a continuous substantially radial plate 105 welded to the shell at 106 and to the skirt at 107.

In assembling the structure the skirt is provided as a unit or single plate, but openings are left thereon directly opposite the meridian seams of the container. The container is then welded through these openings. After welding the openings may be permanently closed with bar inserts as indicated at 108 or by plates. The openings are not essential, however, but are used only for convenience.

In a container of this type access is likewise provided by an opening under the foundation to the bottom of the container. In this way entry may be accomplished for welding the radial plate 105 into position. This plate serves to prevent corrosion in the narrow area above the plate where otherwise it would be difficult to paint.

The skirt at its circle of attachment restricts somewhat the expansion and contraction of the container. As a result slight bulging or contraction, as the case may be, will occur adjacent the circle of attachment of the skirt. To minimize this effect the thickness of the skirt is made the least necessary for strength requirements so that the skirt also will expand and contract. The skirt is reinforced and held by the use of a compression ring 103 on the foundation.

This application is a division of my copending application, Serial No. 542,993, filed June 30, 1944, now Patent No. 2,417,053.

Having described my invention as related to the embodiment set out in the accompanying drawings, it is my intention that the invention be not limited by any of the details of description unless otherwise specified, but rather be construed broadly within its spirit and scope as shown in the accompanying [drawings] *claims*.

I claim:

1. In combination with a container having a substantially circular horizontal cross-section, a support comprising a skirt having substantially the shape of a frustum of a cone, the upper and larger end of the skirt being attached to the container on a substantially horizontal circle below the equator, and a substantially horizontal annular compression plate below said point of attachment with the lower and smaller end of the support skirt resting upon and being attached to said plate.

2. The combination as set forth in claim 1 wherein the skirt and the container are united by a substantially radial sealing member to form a hermetically sealed chamber bounded by the skirt, the container, and the sealing member.

3. The combination as set forth in claim 1 wherein the skirt and the container are united by a substantially radial ring to form a hermetically sealed chamber bounded by the skirt, the container, and the sealing member.

4. The combination as set forth in claim 1 wherein the container is a sphere.

5. The combination as set forth in claim 1 wherein the skirt is substantially tangential to the container.

6. The combination as set forth in claim 1 wherein the container is a sphere and the skirt is substantially tangential to the sphere.

7. The combination as set forth in claim 1 wherein the container is a sphere, the skirt is substantially tangential to the sphere, and the sphere and skirt are united by a substantially radial plate to form a hermetically sealed chamber bounded only by the skirt, the sphere, and the radial plate.

HARRY C. BOARDMAN.

REFERENCES CITED

The following references are of record in the file of this patent or the original patent:

UNITED STATES PATENTS

| Number | Name | Date |
|---|---|---|
| 1,885,601 | Horton | Nov. 1, 1932 |
| 2,156,400 | Pechstein | May 2, 1939 |
| 2,313,823 | Harrigan | Mar. 16, 1943 |
| 2,363,992 | Reiser | Nov. 28, 1944 |